United States Patent
Kong et al.

(10) Patent No.: US 12,399,795 B2
(45) Date of Patent: Aug. 26, 2025

(54) LARGE-SCALE K8S CLUSTER MONITORING METHOD, APPARATUS, DEVICE, AND READABLE MEDIUM

(71) Applicant: INSPUR SUZHOU INTELLIGENT TECHNOLOGY CO., LTD., Jiangsu (CN)

(72) Inventors: Xiangsheng Kong, Shandong (CN); Hui Wang, Shandong (CN); Xianzhuang Li, Shandong (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 127 days.

(21) Appl. No.: 18/265,959

(22) PCT Filed: Sep. 29, 2021

(86) PCT No.: PCT/CN2021/121886
§ 371 (c)(1),
(2) Date: Jun. 7, 2023

(87) PCT Pub. No.: WO2022/134725
PCT Pub. Date: Jun. 30, 2022

(65) Prior Publication Data
US 2024/0037001 A1    Feb. 1, 2024

(30) Foreign Application Priority Data
Dec. 25, 2020   (CN) .................. 202011567627.7

(51) Int. Cl.
*G06F 11/30* (2006.01)

(52) U.S. Cl.
CPC ...... *G06F 11/3051* (2013.01); *G06F 11/3072* (2013.01)

(58) Field of Classification Search
CPC .................. G06F 11/3051; G06F 11/3072
See application file for complete search history.

(56) References Cited

U.S. PATENT DOCUMENTS

| | | | |
|---|---|---|---|
| 2018/0288129 A1* | 10/2018 | Joshi | ............... H04L 43/20 |
| 2020/0099614 A1* | 3/2020 | Vutharkar | ........... G06F 7/14 |

(Continued)

FOREIGN PATENT DOCUMENTS

| | | |
|---|---|---|
| CN | 108494622 A | 9/2018 |
| CN | 110262944 A | 9/2019 |

(Continued)

*Primary Examiner* — Jigar P Patel
(74) *Attorney, Agent, or Firm* — IPro, PLLC

(57) ABSTRACT

A large-scale K8s cluster monitoring method, an apparatus, a computer device, and a readable storage medium. The method includes: performing classification on data sources in a cluster on the basis of a monitoring metric configuration means, and creating a data list on the basis of the data sources and the monitoring metric configuration means corresponding to said data sources; in response to receiving a command to monitor a first monitoring metric set of a first data source, obtaining a monitoring metric configuration means corresponding to the first data source on the basis of the data list; performing configuration on a monitoring metric on the basis of the first monitoring metric set and by means of the obtained monitoring metric configuration means; and obtaining from the first data source a monitoring metric in the first monitoring metric set every preset amount of time, and performing monitoring on the monitoring metric.

14 Claims, 3 Drawing Sheets

(56) References Cited

U.S. PATENT DOCUMENTS

| | | | |
|---|---|---|---|
| 2020/0267212 A1 | 8/2020 | Chatt et al. | |
| 2020/0319935 A1* | 10/2020 | Srivastava | G06F 9/5011 |
| 2021/0117217 A1* | 4/2021 | Croteau | G06F 11/3409 |
| 2021/0303365 A1* | 9/2021 | Li | G06F 9/5066 |

FOREIGN PATENT DOCUMENTS

| | | |
|---|---|---|
| CN | 111752807 A | 10/2020 |
| CN | 112612577 A | 4/2021 |

* cited by examiner

LARGE-SCALE K8S CLUSTER MONITORING METHOD, APPARATUS, DEVICE, AND READABLE MEDIUM

The present application claims the priority of the Chinese patent application filed on Dec. 25, 2020 before the Chinese Patent Office with the application number of 202011567627.7 and the title of "LARGE-SCALE K8S CLUSTER MONITORING METHOD, APPARATUS, DEVICE AND READABLE MEDIUM", which is incorporated herein in its entirety by reference.

FIELD

The present application relates to the technical field of communication, and particularly relates to a large-scale K8s cluster monitoring method and apparatus, a device and a readable medium.

BACKGROUND

With the continuous upgrade and improvement of cloud native application architecture, more and more projects are starting to be deployed and built based on K8s clusters. The full name of K8s is Kubernetes, and it is a portable container orchestration management tool for container services. More and more companies are embracing K8s, and currently K8s has dominated cloud business processes and promoted the popularization and implementation of popular technologies such as microservice architecture. In order to better monitor the K8s cluster, prometheus came into being. Prometheus is an open source system monitoring and alerting toolkit originally built on SoundCloud. Since its establishment in 2012, many companies and organizations have adopted Prometheus. The project has a very active developer and user community. Now, it is an independent open source project and is maintained independently of any company. Its advantage is that it can be seamlessly integrated with K8s, and can realize all-round monitoring of K8s cluster. Its architecture diagram is shown in FIG. 2.

Since the K8s cluster will generate a large amount of monitoring metric data for prometheus to collect, when the K8s cluster reaches a certain scale, it will generate massive monitoring metric data. At this time, prometheus needs to occupy a large amount of CPU resources and memory resources when processing the monitoring data. At this time, there are two existing solutions: one is to drop the monitoring metric data that is not concerned by configuring collection information of prometheus; and the other is to build a prometheus cluster through a federation mechanism of prometheus to distribute the pressure of a single prometheus node.

However, the above two solutions only superficially reduce resource consumption, and their reduction capabilities are limited. First of all, when dropping the monitoring metrics that are not concerned by configuring the collection information of prometheus, all the monitoring metrics need to be pulled into the memory. Since this operation itself consumes a lot of memory, and needs to make recognition before dropping, its effect is mediocre. Secondly, distributing the pressure of a single prometheus node through the federation mechanism only reduces the pressure of a single node. However, in fact, the total resource usage of all prometheus nodes has doubled, which not only increases the difficulty of operation and maintenance, but also brings more hardware costs.

SUMMARY

In view of this, the purpose of the embodiments of the present application is to propose a large-scale K8s cluster monitoring method, an apparatus, a device and a readable medium. By differently processing different data sources from the source, not only resource usage pressure of CPU and memory is effectively reduced, but also network bandwidth consumption within the K8s cluster is greatly reduced, and at the same time, operation and maintenance costs and hardware costs are reduced.

Based on the above purpose, an aspect of the embodiments of the present application provides a large-scale K8s cluster monitoring method, including: performing classification on data sources in a cluster on the basis of a monitoring metric configuration means, and creating a data list on the basis of the data sources and the monitoring metric configuration means corresponding to the data sources; in response to receiving a command to monitor a first monitoring metric set of a first data source, obtaining a monitoring metric configuration means corresponding to the first data source on the basis of the data list; performing configuration on a monitoring metric on the basis of the first monitoring metric set and by means of the obtained monitoring metric configuration means; and obtaining from the first data source a monitoring metric in the first monitoring metric set every preset amount of time, and performing monitoring on the monitoring metric.

In some implementations, the performing classification on data sources in a cluster on the basis of a monitoring metric configuration means includes: classifying the data sources in the cluster into a first type of data source and a second type of data source, wherein the first type of data source prohibits the monitoring metric by modifying a startup parameter, and the second type of data source prohibits the monitoring metric by modifying a configuration file.

In some implementations, the performing configuration on a monitoring metric on the basis of the first monitoring metric set and by means of the obtained monitoring metric configuration means includes: prohibiting a monitoring metric not in the first monitoring metric set by means of the monitoring metric configuration means.

In some implementations, the first monitoring metric set includes at least one of: CPU usage, memory usage, disk usage, disk read/write rate, and network packet loss rate.

In some implementations, the obtaining from the first data source a monitoring metric in the first monitoring metric set every preset amount of time, and performing monitoring on the monitoring metric includes: obtaining from the first data source the monitoring metric in the first monitoring metric set every preset amount of time, and sending the monitoring metric to a system monitoring and alarm system for monitoring; and in response to the monitoring metric being abnormal, giving an alarm by the system monitoring and alarm system.

In some implementations, the system monitoring and alarm system includes prometheus.

Another aspect of the embodiments of the present application further provides a large-scale K8s cluster monitoring apparatus includes: an initial module, configured to perform classification on data sources in a cluster on the basis of a monitoring metric configuration means, and create a data list on the basis of the data sources and the monitoring metric configuration means corresponding to the data sources; a receiving module, configured to in response to receiving a command to monitor a first monitoring metric set of a first data source, obtain a monitoring metric configuration means corresponding to the first data source on the basis of the data list; a performing module, configured to perform configuration on a monitoring metric on the basis of the first monitoring metric set and by means of the obtained monitoring metric configuration means; and a monitoring module, configured to obtain from the first data source a monitoring metric in the first monitoring metric set every preset amount of time, and perform monitoring on the monitoring metric.

In some implementations, the initial module is further configured to: classify the data sources in the cluster into a first type of data source and a second type of data source, wherein the first type of data source prohibits the monitoring metric by modifying a startup parameter, and the second type of data source prohibits the monitoring metric by modifying a configuration file.

In some implementations, the performing module is further configured to: prohibit a monitoring metric not in the first monitoring metric set be means of the monitoring metric configuration means.

In some implementations, the monitoring module is further configured to: obtain from the first data source a monitoring metric in the first monitoring metric set every preset amount of time, and sending the monitoring metric to a system monitoring and alarm system for monitoring;

and in response to the monitoring metric being abnormal, giving an alarm by the system monitoring and alarm system.

Yet another aspect of the embodiments of the present application also provides a computer device, including: at least one processor; and a memory storing computer instructions executable on the processor, wherein when executed by the processor, the instructions implement the operations of the method as described above.

Yet another aspect of the embodiments of the present application also provides a computer-readable storage medium storing a computer program that when executed by a processor, implements the operations of the method as described above.

The present application has the following beneficial technical effects: by differently processing different data sources from the source, not only resource usage pressure of CPU and memory is effectively reduced, but also network bandwidth consumption within the K8s cluster is greatly reduced, and at the same time, operation and maintenance costs and hardware costs are reduced.

BRIEF DESCRIPTION OF THE DRAWINGS

In order to more clearly illustrate the technical solutions of the embodiments of the present application or the prior art, the figures that are required to describe the embodiments or the prior art will be briefly introduced below. Apparently, the figures that are described below are embodiments of the present application, and a person skilled in the art can obtain other embodiments according to these figures without paying creative work.

DETAILED DESCRIPTION

In order to make the objects, the technical solutions and the advantages of the present application clearer, the embodiments of the present application will be further described in detail below in combination with specific embodiments and with reference to the accompanying drawings.

It should be noted that all expressions using "first" and "second" in the embodiments of this application are to distinguish two entities or parameters with the same name but not the same. It can be seen that "first" and "second" are only for the convenience of expression, but should not be understood as limiting the embodiments of the present application, and the subsequent embodiments will not explain them one by one.

Figure 1:
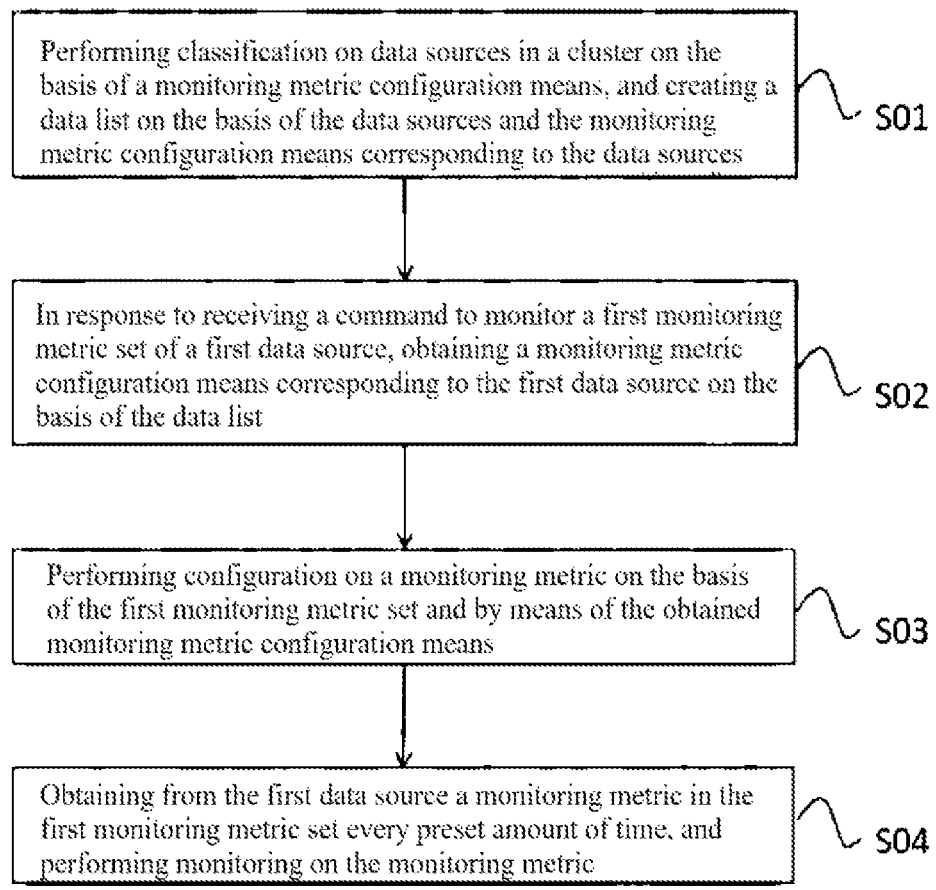
FIG. 1 is a schematic diagram of an embodiment of a large-scale K8s cluster monitoring method provided by the present application.
Figure 2:
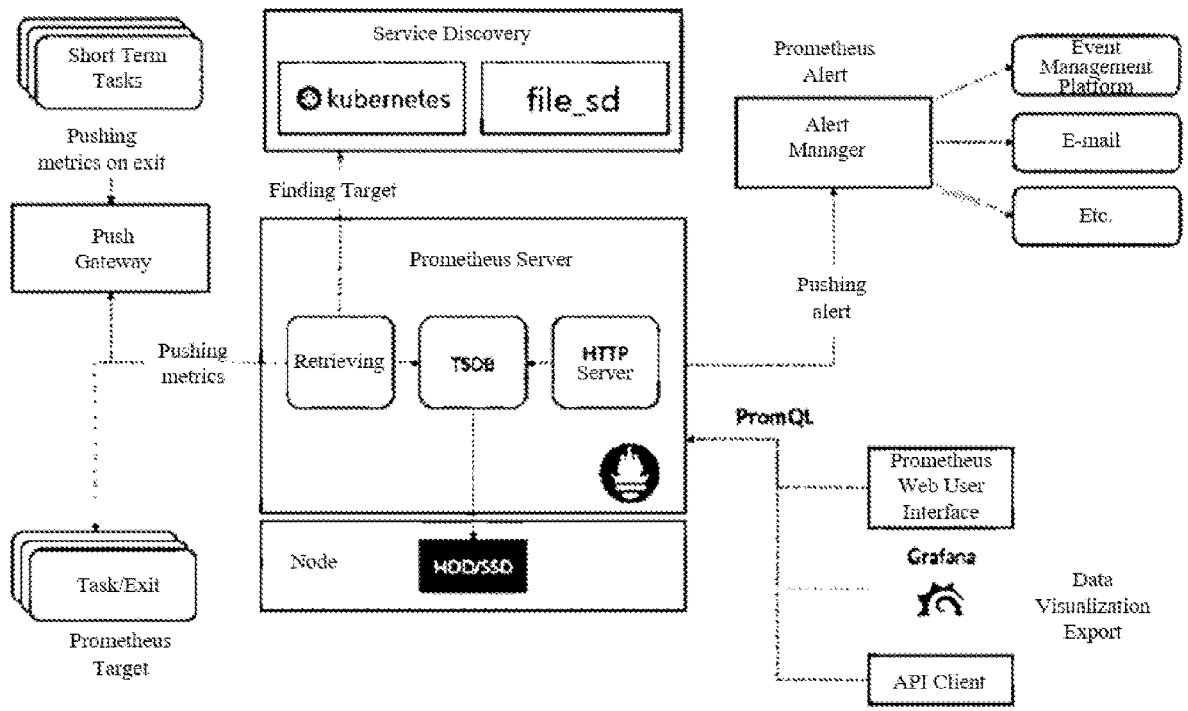
FIG. 2 is an all-round monitoring architecture diagram of the prior art K8s.

On the basis of the above purpose, a first aspect of the embodiments of the present application proposes an embodiment of a large-scale K8s cluster monitoring method. FIG. 1 is a schematic diagram of an embodiment of a large-scale K8s cluster monitoring method provided by the present application. As shown in FIG. 1, the embodiment of the present application includes performing the following steps on a maintenance device side:

S01: performing classification on data sources in a cluster on the basis of a monitoring metric configuration means, and creating a data list on the basis of the data sources and the monitoring metric configuration means corresponding to the data sources;

S02: in response to receiving a command to monitor a first monitoring metric set of a first data source, obtaining a monitoring metric configuration means corresponding to the first data source on the basis of the data list;

S03: performing configuration on a monitoring metric on the basis of the first monitoring metric set and by means of the obtained monitoring metric configuration means; and S04: obtaining from the first data source a monitoring metric in the first monitoring metric set every preset amount of time, and performing monitoring on the monitoring metric.

In this embodiment, various data sources such as kubelet (for providing Pod's monitoring data), node-exporter (for providing node information data), and kube-metric (for providing resource data) are classified, and targeted measures to reduce metrics are performed. Reducing the amount of metric data in the data sources greatly reduces the network bandwidth consumption within K8s and reduces performance loss of the K8s cluster itself.

In some embodiments of the present application, the step of performing classification on data sources in a cluster on the basis of a monitoring metric configuration means includes classifying the data sources in the cluster into a first type of data source and a second type of data source, wherein the first type of data source prohibits a monitoring metric by modifying a startup parameter, and the second type of data source prohibits a monitoring metric by modifying a configuration file.

In this embodiment, node-exporter is used as an example of the first type of data source. For node-exporter, generation of certain monitoring metrics may be prohibited directly by modifying startup parameters. For example: --no-collector-.wifi means not to collect wife-related monitoring data; --no-collector.meminfo means not to collect memory-related monitoring data; and --no- collector.cpu means not to collect CPU-related monitoring data.

In this embodiment, kubelet is used as an example of the second type of data source. For kubelet, generation of certain monitoring metrics may be prohibited directly by modifying a configuration file. For example: cpu.disabled=true means to disable cpu information collection; mem.disabled=true means to disable memory information collection; and net.disabled=true means to disable network information collection.

In some embodiments of the present application, the step of performing configuration on a monitoring metric on the basis of the first monitoring metric set and by means of the obtained monitoring metric configuration means includes: prohibiting a monitoring metric not in the first monitoring metric set by means of the monitoring metric configuration means.

In some embodiments of the present application, the first monitoring metric set includes at least one of: CPU usage, memory usage, disk usage, disk read/write rate, and network packet loss rate.

In some embodiments of the present application, the step of obtaining from the first data source a monitoring metric in the first monitoring metric set every preset amount of time, and performing monitoring on the monitoring metric includes: obtaining from the first data source a monitoring metric in the first monitoring metric set every preset amount of time, and sending the monitoring metric to a system monitoring and alarm system for monitoring; and if the monitoring metric is abnormal, giving an alarm by the system monitoring and alarm system.

In some embodiments of the present application, the system monitoring and alarm system includes prometheus.

In this embodiment, Prometheus is an open source system monitoring and alerting toolkit originally built on SoundCloud. Since its establishment in 2012, many companies and organizations have adopted Prometheus. The project has a very active developer and user community. Now, it is an independent open source project and is maintained independently of any company. Its advantage is that it can be seamlessly integrated with K8s, and can realize all-round monitoring of K8s cluster. Through the above-mentioned compression method for data sources, the resource consumption of prometheus can be effectively reduced.

It should be pointed out that each step in each embodiment of the above-mentioned large-scale K8s cluster monitoring method may be mutually interleaved, replaced, increased, or deleted. Therefore, these reasonable permutation and combination transformations for the large-scale K8s cluster monitoring method also belong to the protection scope of the present application, and the protection scope of the present application should not be limited to the embodiments.

Figure 3:
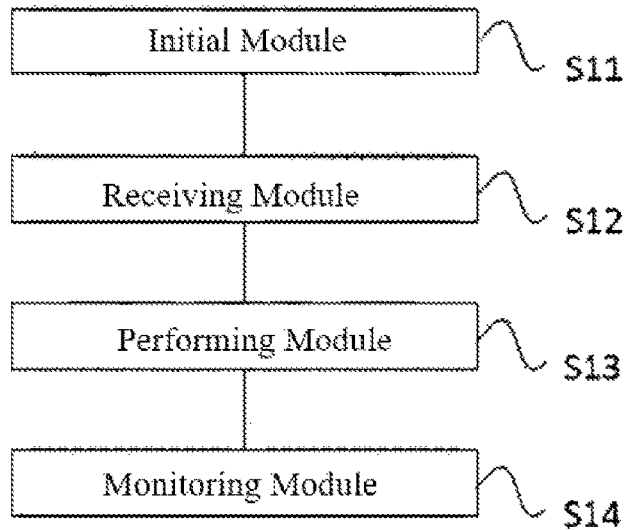
FIG. 3 is a schematic diagram of an embodiment of a large-scale K8s cluster monitoring apparatus provided by the present application.

On the basis of the above purpose, a second aspect of the embodiments of the present application proposes a large-scale K8s cluster monitoring apparatus. FIG. 3 is a schematic diagram of an embodiment of a large-scale K8s cluster monitoring apparatus provided by the present application. As shown in FIG. 3, the embodiment of the present application includes the following modules: an initial module S11, configured to perform classification on data sources in a cluster on the basis of a monitoring metric configuration means, and create a data list on the basis of the data sources and the monitoring metric configuration means corresponding to the data sources; a receiving module S12, configured to in response to receiving a command to monitor a first monitoring metric set of a first data source, obtain a monitoring metric configuration means corresponding to the first data source on the basis of the data list; a performing module S13, configured to perform configuration on a monitoring metric on the basis of the first monitoring metric set and by means of the obtained monitoring metric configuration means; and a monitoring module S14, configured to obtain from the first data source a monitoring metric in the first monitoring metric set every preset amount of time, and perform monitoring on the monitoring metric.

In some embodiments of the present application, the initial module Si 1 is further configured to: classify the data sources in the cluster into a first type of data source and a second type of data source, wherein the first type of data source prohibits a monitoring metric by modifying a startup parameter, and the second type of data source prohibits a monitoring metric by modifying a configuration file.

In some embodiments of the present application, the performing module S13 is further configured to: prohibit a monitoring metric not in the first monitoring metric set by means of the monitoring metric configuration means.

In some embodiments of the present application, the monitoring module S14 is further configured to: obtain from the first data source a monitoring metric in the first monitoring metric set every preset amount of time, and sending the monitoring metric to a system monitoring and alarm system for monitoring; and if the monitoring metric is abnormal, giving an alarm by the system monitoring and alarm system.

Figure 4:
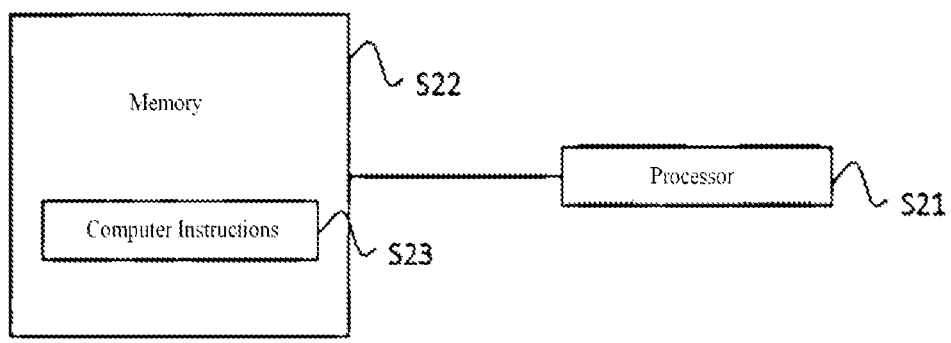
FIG. 4 is a schematic diagram of an embodiment of a computer device provided by the present application.

On the basis of the above purpose, a third aspect of the embodiments of the present application provides a computer device. FIG. 4 shows a schematic diagram of an embodiment of a computer device provided by the present application. As shown in FIG. 4, the embodiment of the present application includes the following components: at least one processor 521; and a memory S22 for storing computer instructions S23 operable on the processor, wherein the instructions may implement the steps of the above method when executed by the processor.

Figure 5:
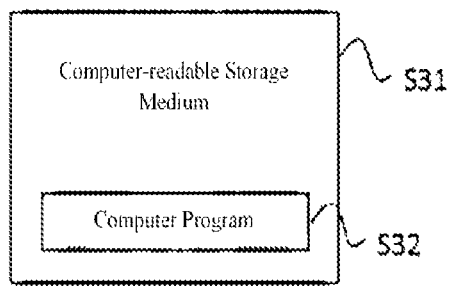
FIG. 5 a schematic diagram of an embodiment of a computer-readable storage medium provided by the present application.

The present application also provides a computer-readable storage medium. FIG. 5 is a schematic diagram of an embodiment of a computer-readable storage medium provided by the present application. As shown in FIG. 5, the computer-readable storage medium S31 stores a computer program S32 for implementing the above method when executed by a processor.

Finally, it should be noted that a person skilled in the art can understand that the realization of all or part of the processes in the methods of the above-mentioned embodiments may be completed by a computer program instructing related hardware. The program of the large-scale K8s cluster monitoring method may be stored in a computer-readable storage medium, and when the program is executed, it may include the processes of the embodiments of the above-mentioned methods. Wherein, the storage medium of the program may be a magnetic disk, an optical disk, a read-only memory (ROM) or a random-access memory (RAM), and the like. The embodiment of the foregoing computer program may achieve the same or similar effects as any of the foregoing method embodiments corresponding thereto.

In addition, the method disclosed in the embodiment of the present application may also be implemented as a computer program executable by a processor, and the computer program may be stored in a computer-readable storage medium. When the computer program is executed by the processor, the above functions defined in the methods disclosed in the embodiments of the present application are carried out.

In addition, the method steps and system units as described above may also be realized using a controller and a computer-readable storage medium for storing a computer program causing the controller to realize the functions of the steps or units above.

A person skilled in the art would also appreciate that various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described generally in terms of their functionality. Whether such functionality is implemented as software or as hardware depends upon the particular application and design constraints imposed on the overall system. A person skilled in the art may implement the described functions in various ways for each specific application, but such implementation decisions should not be interpreted as causing a departure from the scope disclosed in the embodiments of the present application.

In one or more exemplary designs, functions may be implemented in hardware, software, firmware, or any combination thereof. If implemented in software, the functions may be stored on or transmitted over a computer-readable medium as one or more instructions or codes. Computer-readable media includes both computer storage media and communication media including any medium that facilitates transfer of a computer program from one place to another. Storage media may be any available media that can be accessed by a general purpose or special purpose computer. By way of example and not limitation, the computer readable medium may include RAM, ROM, EEPROM, CD-ROM or other optical disk storage device, magnetic disk storage device or other magnetic storage device, or may be any other medium that may be used to carry or store desired program code in the form of instructions or data structures and which can be accessed by a general purpose or special purpose computer or a general purpose or special purpose processor. Also, any connection is properly termed a computer-readable medium. For example, if the software is transmitted from a website, server, or other remote source using coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of media. A magnetic disk and an optical disc, as used herein, include compact disc (CD), laser disc, optical disc, digital versatile disc (DVD), floppy disk, blu-ray disc where magnetic disks usually reproduce data magnetically, while optical discs reproduce data optically with lasers. Combinations of the above should also be included within the scope of computer-readable media.

The above are the exemplary embodiments disclosed in the present application, but it should be noted that various changes and modifications may be made without departing from the scope of the disclosed embodiments of the present application defined by the claims. The functions, steps and/or actions of the method claims in accordance with the disclosed embodiments described herein need not be performed in any particular order. In addition, although the elements disclosed in the embodiments of the present application may be described or required in an individual form, they may also be understood as plural unless explicitly limited to a singular number.

It should be understood that as used herein, the singular form "a" and "an" are intended to include the plural forms as well, unless the context clearly supports an exception. It should also be understood that "and/or" as used herein is meant to include any and all possible combinations of one or more associated listed items.

The serial numbers of the embodiments disclosed in the above-mentioned embodiments of the present application are only for description, and do not represent the advantages and disadvantages of the embodiments.

A person skilled in the art may understand that all or part of the steps for implementing the above-mentioned embodiments may be completed by hardware, or may be completed by a program instructing related hardware. The program may be stored in a computer-readable storage medium and the above-mentioned storage medium may be a read-only memory, a magnetic disk or an optical disk, or the like.

A person skilled in the art should understand that: the discussion of any of the above embodiments is exemplary only, and is not intended to imply that the scope (including claims) disclosed by the embodiments of the present application is limited to these examples; under the idea of the embodiments of the present application, the technical features in the above embodiments or different embodiments may also be combined, and there are many other changes in different aspects of the above embodiments of the present application, which are not provided in details for the sake of brevity. Therefore, within the spirit and principle of the embodiments of the present application, any omissions, modifications, equivalent replacements, improvements, etc., shall be included in the protection scope of the embodiments of the present application.

The invention claimed is:

1. A large-scale K8s cluster monitoring method, comprising:

performing classification on data sources in a cluster on a basis of a monitoring metric configuration means, and creating a data list on a basis of the data sources and the monitoring metric configuration means corresponding to the data sources;

in response to receiving a command to monitor a first monitoring metric set of a first data source, obtaining a monitoring metric configuration means corresponding to the first data source on a basis of the data list;

performing configuration on a monitoring metric on a basis of the first monitoring metric set and by means of the obtained monitoring metric configuration means; and obtaining from the first data source a monitoring metric in the first monitoring metric set every preset amount of time, and performing monitoring on the monitoring metric;

wherein the performing classification on data sources in a cluster on a basis of a monitoring metric configuration means comprises:

classifying the data sources in the cluster into a first type of data source and a second type of data source, wherein the first type of data source prohibits the monitoring metric by modifying a startup parameter, and the second type of data source prohibits the monitoring metric by modifying a configuration file;

wherein the performing configuration on a monitoring metric on the basis of the first monitoring metric set and by means of the obtained monitoring metric configuration means comprises:

prohibiting a monitoring metric not in the first monitoring metric set by means of the monitoring metric configuration means.

2. The large-scale K8s cluster monitoring method according to claim 1, wherein the first monitoring metric set comprises at least one of: CPU usage, memory usage, disk usage, disk read/write rate, and network packet loss rate.

3. The large-scale K8s cluster monitoring method according to claim 1, wherein the obtaining from the first data source a monitoring metric in the first monitoring metric set every preset amount of time, and performing monitoring on the monitoring metric comprises:
   obtaining from the first data source the monitoring metric in the first monitoring metric set every preset amount of time, and sending the monitoring metric to a system monitoring and alarm system for monitoring; and
   in response to the monitoring metric being abnormal, giving an alarm by the system monitoring and alarm system.

4. The large-scale K8s cluster monitoring method according to claim 3, wherein the system monitoring and alarm system comprises prometheus.

5. The large-scale K8s cluster monitoring method according to claim 1, wherein the data sources comprises: kubelet configured for providing Pod's monitoring data, node-exporter configured for providing node information data, and kube-metric configured for providing resource data.

6. The large-scale K8s cluster monitoring method according to claim 1, wherein the first type of data source is node-exporter; and
   modified startup parameters comprise --no-collector.wifi that means not to collect wifi-related monitoring data, --no-collector.meminfo that means not to collect memory-related monitoring data, and --no-collector.cpu means not to collect CPU-related monitoring data.

7. The large-scale K8s cluster monitoring method according to claim 1, wherein the second type of data source is kubelet; and
   modified configuration files comprise cpu.disabled=true that means to disable cpu information collection, mem.disabled=true that means to disable memory information collection, and net.disabled=true that means to disable network information collection.

8. A computer device, comprising:
   at least one processor; and
   a memory storing computer instructions executable on the processor, wherein when executed by the processor, the instructions implement operations comprising:
   performing classification on data sources in a cluster on a basis of a monitoring metric configuration means, and creating a data list on a basis of the data sources and the monitoring metric configuration means corresponding to the data sources;
   in response to receiving a command to monitor a first monitoring metric set of a first data source, obtaining a monitoring metric configuration means corresponding to the first data source on a basis of the data list;
   performing configuration on a monitoring metric on a basis of the first monitoring metric set and by means of the obtained monitoring metric configuration means; and
   obtaining from the first data source a monitoring metric in the first monitoring metric set every preset amount of time, and performing monitoring on the monitoring metric;
   wherein the performing classification on data sources in a cluster on a basis of a monitoring metric configuration means comprises:
   classifying the data sources in the cluster into a first type of data source and a second type of data source, wherein the first type of data source prohibits the monitoring metric by modifying a startup parameter, and the second type of data source prohibits the monitoring metric by modifying a configuration file;
   wherein the performing configuration on a monitoring metric on the basis of the first monitoring metric set and by means of the obtained monitoring metric configuration means comprises:
   prohibiting a monitoring metric not in the first monitoring metric set by means of the monitoring metric configuration means.

9. The computer device according to claim 8, wherein the first monitoring metric set comprises at least one of: CPU usage, memory usage, disk usage, disk read/write rate, and network packet loss rate.

10. The computer device according to claim 8, wherein the obtaining from the first data source a monitoring metric in the first monitoring metric set every preset amount of time, and performing monitoring on the monitoring metric comprises:
    obtaining from the first data source the monitoring metric in the first monitoring metric set every preset amount of time, and sending the monitoring metric to a system monitoring and alarm system for monitoring; and
    in response to the monitoring metric being abnormal, giving an alarm by the system monitoring and alarm system.

11. The computer device according to claim 10, wherein the system monitoring and alarm system comprises prometheus.

12. A non-transitory computer-readable storage medium, storing a computer program, wherein when executed by a processor, the computer program implements operations comprising:
    performing classification on data sources in a cluster on a basis of a monitoring metric configuration means, and creating a data list on a basis of the data sources and the monitoring metric configuration means corresponding to the data sources;
    in response to receiving a command to monitor a first monitoring metric set of a first data source, obtaining a monitoring metric configuration means corresponding to the first data source on a basis of the data list;
    performing configuration on a monitoring metric on a basis of the first monitoring metric set and by means of the obtained monitoring metric configuration means; and
    obtaining from the first data source a monitoring metric in the first monitoring metric set every preset amount of time, and performing monitoring on the monitoring metric;
    wherein the performing classification on data sources in a cluster on a basis of a monitoring metric configuration means comprises:
    classifying the data sources in the cluster into a first type of data source and a second type of data source, wherein the first type of data source prohibits the monitoring metric by modifying a startup parameter, and the second type of data source prohibits the monitoring metric by modifying a configuration file;

wherein the performing configuration on a monitoring metric on the basis of the first monitoring metric set and by means of the obtained monitoring metric configuration means comprises:

prohibiting a monitoring metric not in the first monitoring metric set by means of the monitoring metric configuration means.

13. The non-transitory computer-readable storage medium according to claim 12, wherein the first monitoring metric set comprises at least one of: CPU usage, memory usage, disk usage, disk read/write rate, and network packet loss rate.

14. The non-transitory computer-readable storage medium according to claim 12, wherein the obtaining from the first data source a monitoring metric in the first monitoring metric set every preset amount of time, and performing monitoring on the monitoring metric comprises:

obtaining from the first data source the monitoring metric in the first monitoring metric set every preset amount of time, and sending the monitoring metric to a system monitoring and alarm system for monitoring; and in response to the monitoring metric being abnormal, giving an alarm by the system monitoring and alarm system.

\* \* \* \* \*